United States Patent
Cabasson et al.

(10) Patent No.: US 6,956,904 B2
(45) Date of Patent: Oct. 18, 2005

(54) SUMMARIZING VIDEOS USING MOTION ACTIVITY DESCRIPTORS CORRELATED WITH AUDIO FEATURES

(75) Inventors: Romain Cabasson, Paris (FR); Kadir A. Peker, Paterson, NJ (US); Ajay Divakaran, Denville, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 635 days.

(21) Appl. No.: 10/046,790

(22) Filed: Jan. 15, 2002

(65) Prior Publication Data

US 2003/0133511 A1 Jul. 17, 2003

(51) Int. Cl.⁷ .................................................. H04B 1/66
(52) U.S. Cl. ........................ 375/240.26; 375/240.08; 375/240.03; 375/240.11; 375/240.16; 375/240.21; 375/240.28; 704/501; 704/504; 382/236; 382/238; 382/251; 382/243; 348/699
(58) Field of Search ....................... 375/240.26, 240.08, 375/240.03, 240.11, 240.16, 240.21, 240.28; 704/501, 504; 382/236, 238, 251, 243; 348/699, 700

(56) References Cited

U.S. PATENT DOCUMENTS 6,339,756 B1 * 1/2002 Hinderks .................... 704/201
6,763,069 B1 * 7/2004 Divakaran et al. ..... 375/240.08
6,782,049 B1 * 8/2004 Dufaux et al. ......... 375/240.01

* cited by examiner

Primary Examiner—Shawn S. An
(74) Attorney, Agent, or Firm—Dirk Brinkman; Andrew J. Curtin

(57) ABSTRACT

A method for summarizing a video first detects audio peaks in a sub-sampled audio signal of the video. Then, motion activity in the video is extracted and filtered. The filtered motion activity is quantized to a continuous stream of digital pulses, one pulse for each frame. If the motion activity is greater than a predetermined threshold the pulse is one, otherwise the pulse is zero. Each quantized pulse is tested with respect to the timing of rising and falling edges. If the pulse meets the condition of the test, then the pulse is selected as a candidate pulse related to an interesting event in the video, otherwise the pulse is discarded. The candidate pulses are correlated, time-wise to the audio peaks, and patterns between the pulses and peaks are examined. The correlation patterns segment the video into uninteresting and interesting portions, which can then be summarized.

17 Claims, 1 Drawing Sheet

SUMMARIZING VIDEOS USING MOTION ACTIVITY DESCRIPTORS CORRELATED WITH AUDIO FEATURES

FIELD OF THE INVENTION

This invention relates generally to summarizing videos, and more particularly to summarizing videos using correlated motion and audio features extracted from videos.

BACKGROUND OF THE INVENTION

Video summarization can be defined generally as a process that generates a compact or abstract representation of a video, see A. Hanjalic and Hong Jiang Zhang, "*An Integrated Scheme for Automated Video Abstraction Based on Unsupervised Cluster-Validity Analysis*, IEEE Trans. On Circuits and Systems for Video Technology, Vol. 9, No. 8, December 1999. Previous work on video summarization has mostly emphasized clustering based on color features, because color features are easy to extract and robust to noise. The summary itself consists of either a summary of the entire video or a concatenated set of interesting segments of the video.

It is also possible to use motion descriptors to generate video summaries, see U.S. patent application Ser. No. 09/715,639 "*Adaptively Processing a Video Based on Content Characteristics of Frames in the Video*," filed by Peker et al., on Aug. 9, 2000, U.S. patent application Ser. No. 09/839,924 "*Method and System for High Level Structure Analysis and Event Detection in Domain Specific Videos*," filed by Xu et al., on Jul. 6, 2000, U.S. patent application Ser. No. 09/997,479 "*Unusual Event Detection Using Motion Activity Descriptors*," filed by Divakaran on Nov. 19, 2001, and U.S. patent application Ser. No. 10/005,623 "*Structure Analysis of Video Using Hidden Markov Models*," filed by Divakaran et al., on Dec. 5, 2001.

In other works, see A. Divakaran and H. Sun, "*A Descriptor for spatial distribution of motion activity*," Proc. SPIE Conference on Storage and Retrieval for Media Databases, San Jose, Calif., January 2000, K. Peker and A. Divakaran, "*Automatic Measurement of Intensity of Motion Activity of Video Segments*," Proc. SPIE Conference on Storage and Retrieval from Multimedia Databases, San Jose, Calif., January 2001, and S. Jeannin and A. Divakaran, "*MPEG-7 visual motion descriptors*," in IEEE Trans. Circuits and Systems for Video Technology, June 2001, the use of motion features derived from compressed domain motion vectors to measure the motion activity and the spatial distribution of motion activity in videos was described. Such descriptors have been successful in video browsing applications by filtering out all high or low action shots, depending on the content and the application.

As stated by Jeannin et al., "A human watching a video or animation sequence perceives it as being a slow sequence, or a fast paced sequence or an action sequence, etc. The activity feature captures this intuitive notion of 'intensity of action' or 'pace of action' in a video segment. Examples of high 'activity' include scenes such as 'goal scoring in a soccer match,' 'scoring in a basketball game,' 'a high speed car chase,' etc. On the other hand scenes such as 'news reader shot,' 'an interview scene,' 'a still shot, etc. are perceived as low action shots. Video content in general spans the gamut from high to low activity, therefore we need a descriptor that enables us to accurately express the activity of a given video sequence/shot and comprehensively covers the aforementioned gamut."

The recently proposed MPEG-7 video standard provides such a motion activity descriptor. The intensity of the motion activity is measured by suitably quantizing the standard deviation of the motion vector magnitude.

Video summarization can be based on the notion that motion activity is in fact an indication of the summarizability of a video sequence. For example, an adaptive playback speed adjustment can be used to maintain constant motion activity at the display. In other words, parts of the video with lesser amount of motion activity form a smaller part of the summary, while parts with greater motion activity form the bulk of the summary. Thus, the less interesting parts can be skipped quickly.

SUMMARY OF THE INVENTION

The invention provides a system and method for summarizing a compressed video using temporal patterns of motion activity extracted in the compressed domain. The temporal patterns are correlated with temporal locations of audio features, specifically peaks in the audio volume. The invention is based on the fact that temporal patterns of motion activity and audio levels are related to a grammar of the video. By using very simple rules, depending on the type of content in the videos, the invention generates a summary by discarding uninteresting parts of the video and identifying interesting events characterized, for instance, by falling edge or raising edge in the activity domain. Moreover the compressed domain extraction of motion activity and audio intensity is much simpler than the color based summarization of the prior art. Other compressed domain features or more complex rules can be used to further improve the accuracy of the summary.

More particularly, a system and method summarizes a compressed video by first detecting audio peaks in a sub-sampled audio signal of the video. Then, motion activity in the video is extracted and filtered. The filtered motion activity is quantized to a continuous stream of digital pulses, one pulse for each frame. If the motion activity is greater than a predetermined threshold the pulse is one for the duration of the frame, otherwise the pulse is zero. Each quantized pulse is tested with respect to the timing of the respective rising and falling edges. If the pulse meets the condition of the test, then the pulse is selected as a candidate pulse related to an interesting event in the video, otherwise the pulse is discarded. that is, set to zero. The candidate pulses are correlated, time-wise to the audio peaks, and patterns between the pulses and peaks are examined. The correlation patterns segment the video into uninteresting and interesting portions, which can then be summarized.

DETAILED DESCRIPTION OF THE PREFERRED EMBODIMENT

Video Summarization Method and System

Figure 1:
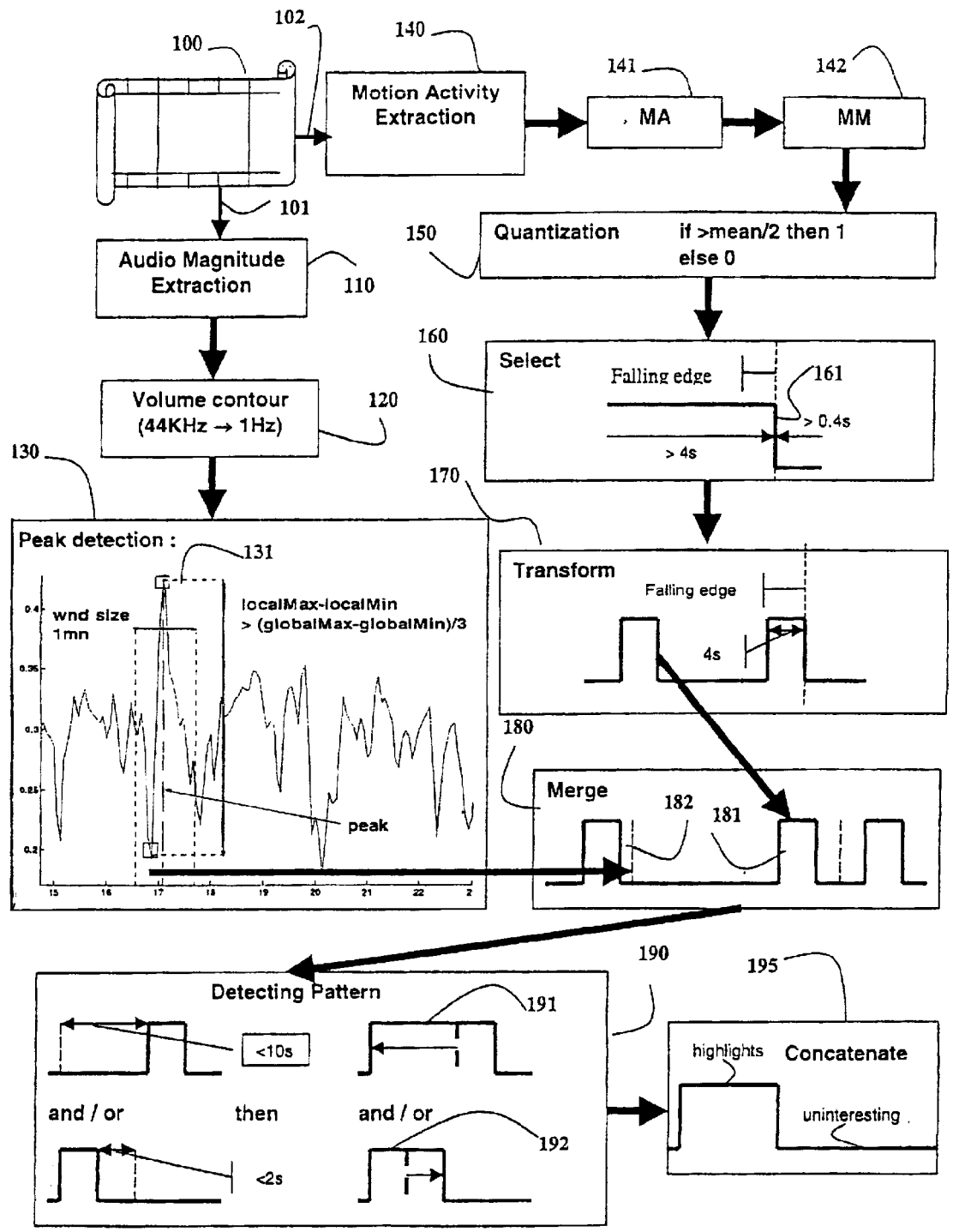
FIG. 1 is a flow diagram of a method and system for summarizing a video according to the invention.

The video summarization according to our invention extracts highlights from a compressed video 100 using two independent parts, an audio signal 101 and a video signal. We apply audio magnitude extraction 110 to the audio part 101, and motion activity extraction 140 to the video part 102, as described in greater detail below.

Audio Magnitude Extraction

The audio magnitude extraction 110 processes sub-samples, e.g., a 44 KHz audio signal of the video 100 down to a 1 KHz volume contour 120 by averaging. Then, we perform peak detection 130 by applying a sliding window to the sub-sampled 1 KHz signal 120. The sliding window (wnd) has a width of, e.g., one minute (mn), and slides forward in time in half minute steps. In each time step, a local volume maximum is identified as a peak if:

(localMax−localMin)>(globalMax−globalMin)/3, using a local minimum, a global maximum, and a global minimum. The global maximum and minimum can be predetermined. Thus, we detect audio peaks throughout the entire video 100. It should be noted that other audio peak detection techniques can also be used.

Motion Activity Extraction

The video motion activity extraction process 140 first determines the motion activity (MA) 141 of each P-frame in the compressed video 100. We measure the motion activity 141 as an average of the magnitudes of the motion vectors of each P-frame. Then, a moving average filter (MA) and a moving median filter (MM) 142 are applied to the extracted motion activity. This we do to heavily smooth the extracted motion activity values, so as to counteract any noise in the video.

Quantize Motion Activity

Next, the smoothed motion activity values are quantized 150, on a per frame basis, using a binary threshold to generate a continuous quantized signal representing the entire video. If the motion activity value for a particular frame is greater than half the mean motion activity of the entire content of the video, then the quantized motion activity value is set to one for the duration of the frame, else the value is zero. The mean motion activity of the video can also be predetermined.

Quantizing 150 represents the video 100 as a stream of digital pulses of the continuous quantized signal as shown in FIG. 1. A one or high pulse extends for the duration of frames of the video with a high level of motion activity, and a zero or low pulse for frames of the video with a low level of motion activity. Of particular interest, described below, are the falling edges of the pulses of the quantized signal.

Pulse Selection

Next, a heuristic for particular content can be applied to the stream of pulses of the quantized signal representing the motion activity of the video 100.

A selection test 160 is applied to each falling edge 161, that is, a 1 to 0, or high to low transition. We test whether the activity was at level 1 for at least 4 seconds before it falls to level 0. We also test to see if the quantized signal then remains at level 0 for at least 0.4 seconds, for example. If the falling edge satisfies this test, then we select that falling edge as a candidate for locating an interesting event in the video. It should be noted that the exact timing used in the selection 160 can vary depending on the heuristic used, and the content of the video to be summarized.

Quantized Signal Transformation

Furthermore, we perform a transformation 170 on the quantized signal for only the pulses with the falling edge that meet the above selection tests. Pulses that do not meet the above requirements are discarded from the quantized signal. That is, those pulses are set to zero. We mark the time four seconds prior to the selected falling edge, and designate this time as the location of a new rising edge to be associated with the selected falling edge. Thus, at the end of the transformation process 170, we obtain a set of four second wide pulses through the time axis of the entire content of the video 100. Each four second pulse is potentially associated with an interesting event in the video. The intuitive reasoning behind this is that whenever something interesting has occurred in the video, a lull in activity usually follows immediately.

For example, in a sports video, a scoring event is followed by a stop in play. Also, an interesting event is usually preceded by a continuous stretch of high activity. The exact timing of these activity level transitions depend, of course, on the domain of the video content.

Audio Peak and Activity Pulse Merging

The transformed four second pulses are merged 180, time-wise, with the audio peaks detected in step 130 to obtain a set of time-correlated motion activity pulses 181 and audio peaks 182.

The intuitive motivation for correlating motion activity with audio peaks is that we are actually measuring a local rise of audio volume in anticipation of, or after an interesting event, for example, the proverbial "drum roll," or the reaction of a crowd watching a sporting event.

Pattern Detection

Every audio peak 182 is subjected to the following pattern detection tests 190 to determine whether the peak is associated with an interesting event in the video. The time width of the event is obtained along with the test.

First, we test 191 to see if there is a rising edge less than ten seconds after the audio peak 182. If true, then the entire duration starting from the audio peak 182 and ending at the first falling edge after the audio peak is designated as an interesting event 191. If false, then we declare that the audio peak is not correlated with a subsequent falling edge in motion activity, and we did not find an interesting event subsequent to the audio peak. Note that the duration of the interesting event 191 obtained this way can vary between four seconds and fourteen seconds, for example, depending on the relative location of the audio peak and the associated falling edge.

Second, we test if there is a falling edge less than two seconds prior to the audio peak. If true, then we designate the entire duration starting from the immediately preceding rising edge all the way to the audio peak, as an interesting event 192. Note that the duration of the interesting event 192 obtained this way can vary from six seconds to four seconds, for example.

Event Concatenation

After detecting the patterns associated with interesting events, we concatenate 195 the interesting event duration obtained above to form the final interesting event associated with the audio peak. Thus, for example, if the first and second tests are false, then we do not have an interesting event, and otherwise we do. This process essentially segments the video 100 into interesting and uninteresting events on the time axis. This segmentation can now be used to summarize the input video 100 by, for example, discarding all frames that are uninteresting, and concatenating only the interesting frames into the summary.

The invention, as described above, summarizes a video by selectively skipping over "uninteresting" frames of the video while retaining "interesting frames." The summarization applies domain knowledge of the activity in the video to temporal patterns of the motion activity and audio peaks to decide which parts of the video sequence are interesting and uninteresting.

EFFECT OF THE INVENTION

We note that prior art shot detection does not work too well, particularly with sports videos. The reason is that in sport videos the shots are usually very long, and there is considerable camera motion. Thus, the notion of a shot is not as semantically meaningful as with other content. Our heuristic is therefore based on a frame by frame analysis.

First, we locate audio peaks in the video on a time axis using a peak detection technique. We also obtain the time-wise motion activity signal by determining the motion activity for each P-frame. Then, we smooth the motion activity signal by applying, e.g., a ten sample moving average, followed by a median filter. We quantized the motion activity signal into two levels, zero and one, and select and transform quantized pulses according to predetermined timing information. The transformed pulses are merged with the audio peaks, and the timing relationships between the peaks and pulses are correlated to segment the video into interesting and uninteresting portions that can be used to summarize the video.

This method provides a visually satisfying moving summary rather than pinpointing every interesting event accurately. Our summarization system and method efficiently filters most of the uninteresting parts of a sports video.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for summarizing a compressed video, comprising:
    detecting audio peaks in an audio signal of the video;
    quantizing motion activity in the video as a continuous stream of pulses; and
    correlating the audio peaks with the stream of quantized pulses to identify uninteresting events and interesting events in the video to summarize the video.

2. The method of claim 1 further comprising:
    discarding frames of the video associated with the uninteresting events; and
    concatenating frames of the video associated with the interesting events to form a summary of the video.

3. The method of claim 1 further comprising:
    sub-sampling the audio signal of the video down to a volume contour; and
    applying a sliding window to the volume contour to detect a local maximum corresponding to a particular audio peak.

4. The method of claim 3 where the local maximum is detected when (localMax−localMin)>(globalMax−globalMin)/3, using a local minimum, and predetermined global maximum and a predetermined global minimum.

5. The method of claim 3 wherein the sliding window has a duration of one minute, and slides forward in time in half minute steps.

6. The method of claim 1 further comprising:
    extracting the motion activity from each P-frame in the video;
    applying a moving average filter and a moving median filter to the extracted motion activity to generated smoothed motion activity; and
    setting the smoothed motion activity for each P-frame to one if greater than a predetermined threshold, and zero otherwise to quantize the motion activity as the continuous stream of pulses.

7. The method of claim 1 further comprising:
    measuring an average of magnitudes of motion vectors of each P-frame to extract the motion activity.

8. The method of claim 6 wherein the predetermined threshold is half a mean motion activity of the compressed video.

9. The method of claim 6 further comprising:
    testing each pulse to determine whether the quantized motion activity is at one for at least a first predetermined length of time before falling to zero and remains at zero for a second predetermined length of time; and
    selecting the test pulse as a candidate pulse associated with a particular interesting event in the video.

10. The method of claim 9 further comprising:
    discarding pulses failing the test from the continuous stream of pulses; and
    transforming each candidate pulse to have a third predetermined length of time.

11. The method of claim 10 further comprising:
    merging the transformed pulses, time-wise, with the detected audio peaks to obtain a set of time-correlated transformed pulses and audio peaks.

12. The method of claim 11 further comprising:
    testing if a rising edge of a particular transformed pulse is less than ten seconds after a particular time-correlated audio peak; and
    designating an entire duration starting from the particular audio peak and ending at a first falling edge after the particular audio peak is as a particular interesting event if true.

13. The method of claim 11 further comprising:
    testing if a falling edge of a particular transformed pulse is less than two seconds before a particular audio peak; and
    designating an entire duration starting from an immediately preceding rising edge and ending at the particular audio peak as a particular interesting event if true.

14. A system for summarizing a compressed video, comprising:
    means for detecting audio peaks in an audio signal of the video;
    means for quantizing motion activity in the video as a continuous stream of pulses; and
    means for correlating the audio peaks with the stream of quantized pulses to identify uninteresting events and interesting events in the video to summarize the video.

15. The system of claim 14 further comprising:
    means for discarding frames of the video associated with the uninteresting events; and
    means for concatenating frames of the video associated with the interesting events to form a summary of the video.

16. The system of claim 14 further comprising:
    means for extracting the motion activity from each P-frame in the video;
    means for applying a moving average filter and a moving median filter to the extracted motion activity to generated smoothed motion activity; and
    means for setting the smoothed motion activity for each P-frame to one if greater than a predetermined threshold, and zero otherwise to quantize the motion activity as the continuous stream of pulses.

17. The system of claim 16 further comprising:
    means for testing each pulse to determine whether the quantized motion activity is at one for at least a first predetermined length of time before falling to zero and remains at zero for a second predetermined length of time; and
    means for selecting the test pulse as a candidate pulse associated with a particular interesting event in the video.

* * * * *